Oct. 10, 1961 W. J. GREENE 3,004,166
LINE TRACER APPARATUS AND METHOD
Filed Sept. 16, 1958 7 Sheets-Sheet 1

INVENTOR.
WILLIAM J. GREENE
BY H. Hume Mathews
Edmund W Bopp
ATTORNEY & AGENT

Oct. 10, 1961  W. J. GREENE  3,004,166
LINE TRACER APPARATUS AND METHOD
Filed Sept. 16, 1953  7 Sheets-Sheet 3
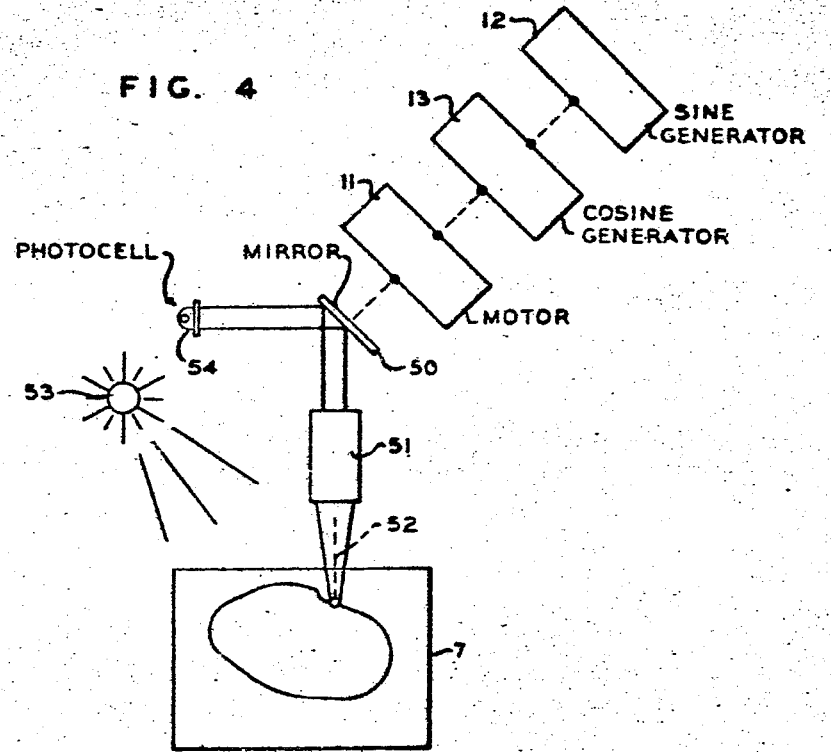
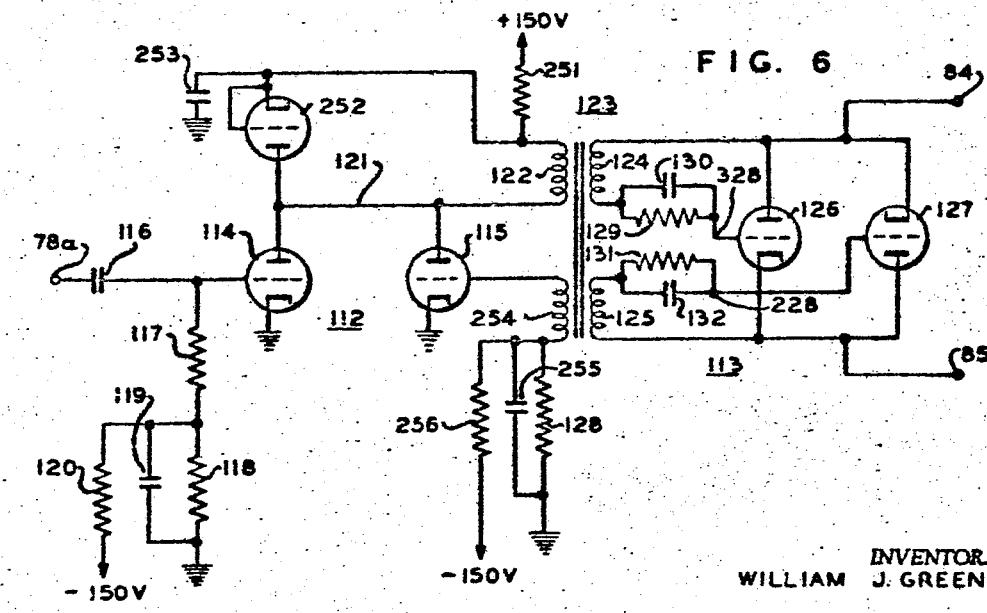
INVENTOR.
WILLIAM J. GREENE
BY
ATTORNEY & AGENT

INVENTOR.
WILLIAM J. GREENE

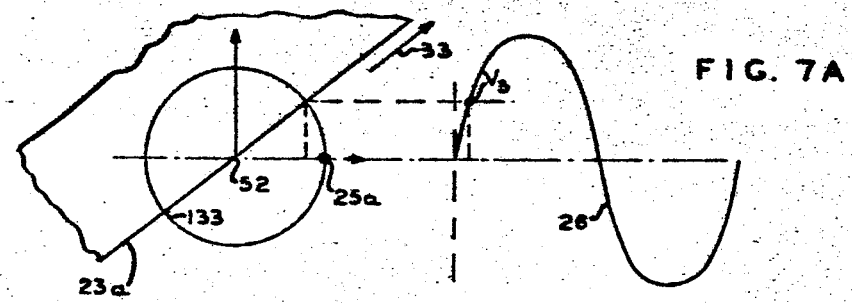
FIG. 7A
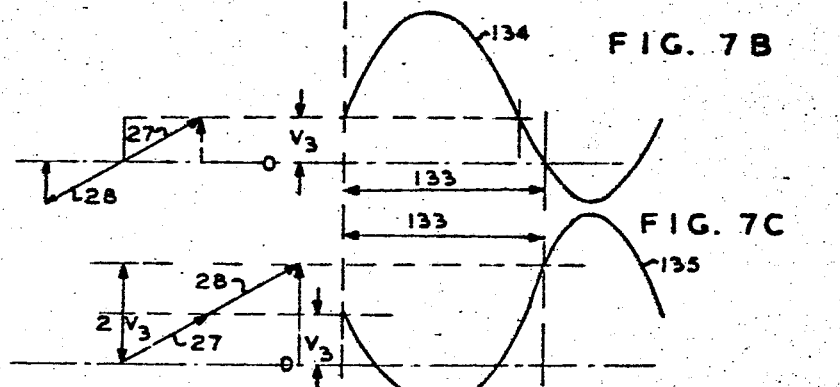
FIG. 7B
FIG. 7C
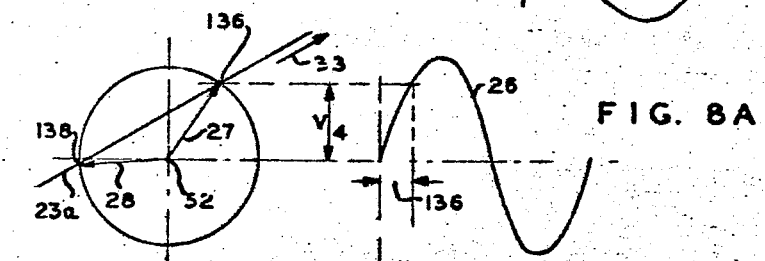
FIG. 8A
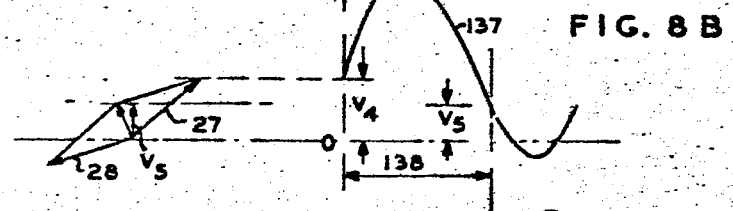
FIG. 8B
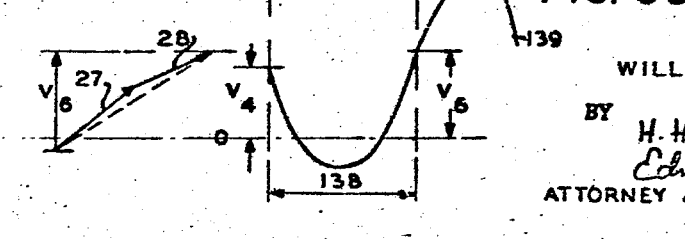
FIG. 8C
INVENTOR
WILLIAM J. GREENE
ATTORNEY & AGENT

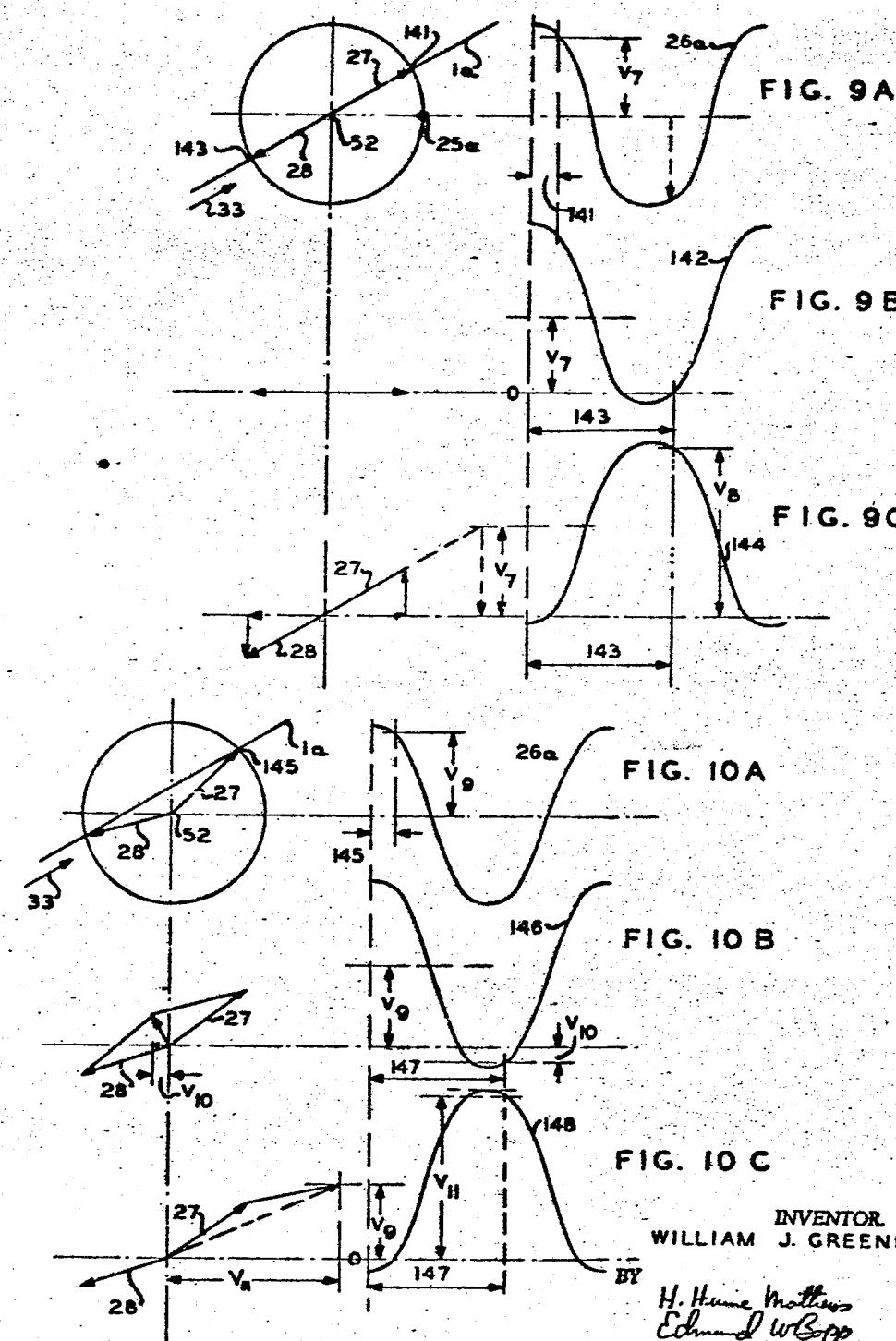

Oct. 10, 1961 W. J. GREENE 3,004,166
LINE TRACER APPARATUS AND METHOD
Filed Sept. 16, 1958 7 Sheets-Sheet 7
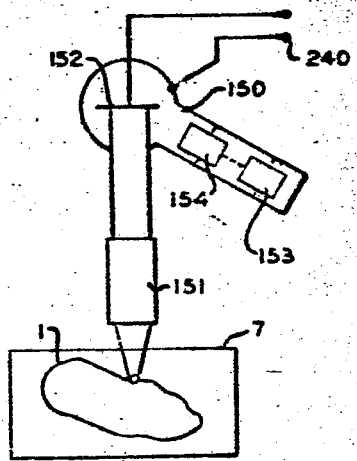
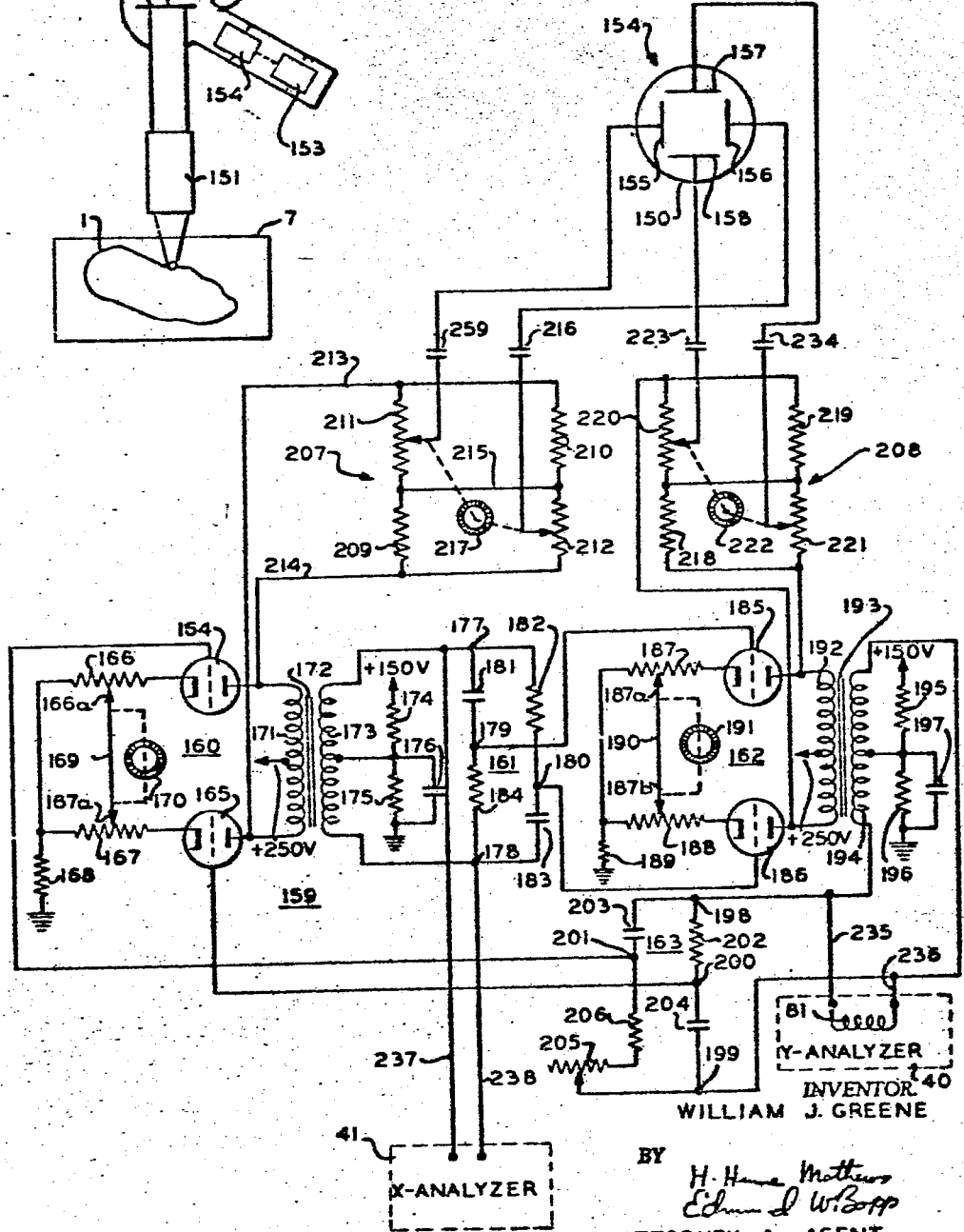
INVENTOR
WILLIAM J. GREENE
BY
H. Hans Matthews
Edmund W. Bopp
ATTORNEY & AGENT 3,004,166
LINE TRACER APPARATUS AND METHOD
William J. Greene, Scotch Plains, N.J., assignor to Air
Reduction Company, Incorporated, New York, N.Y., a
corporation of New York
Filed Sept. 16, 1958, Ser. No. 761,389
19 Claims. (Cl. 250—202)

This invention relates to line tracers, and especially to tracers for controlling a machine to reproduce in a workpiece a pattern traced by the tracer.

The line tracer of the present invention is illustrated herein as applied to an oxygen cutting machine. While this invention has particular utility when the tracer is used in combination with such a machine, many features of the invention have a broader utility in connection with tracer mechanisms generally, regardless of the nature of the ultimate controlled mechanism.

The optimum speed of operation of a cutting machine or the like is determined by the thickness and other physical characteristics of the workpiece and the characteristics of the machine itself. When such a machine is manually controlled, a skillful operator may utilize that optimum speed regardless of the curvature of the path being followed.

It has been proposed to control such cutting machines by means of light sensitive tracers following lines or pattern edges. However, the tracer controls of the prior art are not completely satisfactory in that they can not operate accurately at the optimum cutting speed. Furthermore, they cannot accurately follow sharp curves and angles in the pattern.

An object of the invention is to provide an improved line tracer mechanism which can operate with greater speed and accuracy than the tracer mechanisms of the prior art.

Another object is to provide a line tracer mechanism for controlling a pattern reproducing mechanism and operable at a speed determined by the characteristics of the pattern reproducing mechanism and of the workpiece.

Another object is to provide an improved line tracer mechanism for controlling an oxygen cutting head.

A further object is to provide such a mechanism including improved means for starting the head at the edge of the workpiece and bringing it through a marginal area to the zone where the pattern is formed.

Another object is to provide a line tracer mechanism which is reversible in that it can trace a line in either direction or trace a closed loop either clockwise or counterclockwise.

Another object is to provide a line tracer including improved means for measuring the apparent deviation of the tracer from the line to be traced. A further object is to provide apparatus of the type described in which the apparent deviation is measured as a vector by means of electrical signals.

A further object is to provide apparatus of the type described in which an electrical signal is produced which varies as an inverse function of the apparent deviation.

A further object is to provide an improved line tracer of the type described including two motors for driving the tracer in two coordinate directions, in which each motor is provided with means for producing a signal which measures the motor speed, means for opposing the motor speed measuring signal to the inversely varying signal to determine the algebraic sum of those two opposed signals, and means for controlling the motor in response to the resultant of that algebraic sum and the signal which measures the apparent deviation.

Another object is to provide improved scanning mechanism for a line tracer mechanism. A further object is to provide such a scanning mechanism in which the scanning is done by a cathode ray moving in a circular path over a photo-sensitive screen on which is projected an image of the line to be traced.

A further object is to provide an improved motor control system including improved speed controlling mechanism.

A further object is to provide an improved method of tracing a line including cyclically scanning a circular path intersecting the line and having its center normally on the line, deriving two pulse signals whose time displacement measures the directions from the center of the two (leading and lagging) intersections of the path and line and utilizing said signals to control motors respectively driving the tracer mechanism in two coordinate directions.

A further object is to provide an improved tracing method of the type described, in which the signals are utilized to sample synchronous sinusoidal signals to produce potentials whose amplitude measures the components of displacement of the intersections from the center in the two coordinate directions.

A further object is to provide an improved method of the type described in which the two component potentials in each direction for the two intersections are summed to give error signals measuring the apparent deviation of the center in the respective directions from the line being traced, and are subtracted to give a difference signal varying inversely with the apparent deviation.

A further object is to provide an improved tracing method of the type described, including the further steps of producing a velocity measuring signal for each motor, opposing the velocity signal against a manually selected proportion of the difference signal to determine the algebraic sum of the opposed signals, and controlling the motor in response to the resultant of that algebraic sum and the signal measuring the apparent deviation.

A further object is to provide an improved method of controlling the velocity of a motor in response to changes in a variable condition.

Another object is to provide an improved method of measuring the displacement of an optical axis from a line to be traced, including scanning a circular path about the axis, producing a sinusoidal signal synchronous with the scanning cycle, sampling the synchronous signal at times marked by the intersections of the path with the line and utilizing the sampled signals to measure the apparent deviation of the optical axis from the line.

The foregoing and other objects of the invention are attained in the apparatus described and illustrated herein. That apparatus includes a table for supporting a pattern which defines a line between areas of contrasting optical characteristics. A tracer element is provided utilizing light sensitive means for scanning cyclically a circular path of small diameter about an optical axis extending at an angle to the table. The light sensitive means forms part of a pick-up for producing an electrical signal whenever the circular path crosses the line to be followed. Two motors are provided for driving the table with respect to the tracer in orthogonally related or coordinated directions. Means are provided for selecting a linear velocity value for the speed with which the tracer follows the pattern. An analyzer is provided for analyzing the signals produced by the pick-up and controlling the two motors to produce coordinate velocities whose resultant velocity along the line to be traced is determined by the selected velocity, as long as the tracer stays on the line. When the tracer moves off the line for any reason, the two coordinate velocities are varied as required to restore it to the line.

The analyzer includes means for producing two sinusoidally varying signals synchronously related to the scanning cycle and having a time phase displacement from each other corresponding to the angular displacement between the two coordinate directions.

The pick-up signals are pulses occurring at the instant when the light beam scanning the path crosses the line being traced. Each pulse is produced by the different response of the light sensitive device to the different optical characteristics on opposite sides of the line. Two signals are produced during each cycle, one when the earlier or advancing side of the circular path intersects the line, termed the leading signal pulse, and the other when the later or following side of the circular path intersects the line, termed the lagging signal pulse. Each leading signal pulse is utilized to sample the two sinusoidally varying signals to determine two potential values which are measures of coordinate component vectors. These two potential values are added to the sinusoidally varying signals to produce composite signals which are sampled by the lagging pulses. This second sampling determines two potential values for each coordinate direction, which respectively respresent the sum and difference of the components in that direction of two vectors measuring the phase angles of the lagging and leading pulses. The sum potential varies directly with the apparent deviation of the center of the scanning circle from the line and is termed the error signal. The difference potential which varies inversely with the apparent deviation is utilized to derive a velocity control signal.

The two motors drive tachometers which produce signals measuring the actual velocity of the motors. A proportion of each inverse signal determined by the setting of a normal velocity selector, is bucked against its associated tachometer signal. The algebraic difference between the inverse signal and the tachometer signal is the velocity control signal, and, as modified by the error signal, is utilized to control the motor speed. The respective component velocities of the motors have a vector sum determined, in the absence of apparent deviation, by the selected linear velocity.

Other objects and advantages of the invention will become apparent from a consideration of the following specification and claims, taken together with the accompanying drawings, in which:

FIG. 4 is a somewhat diagrammatic view illustrating one form of scanning mechanism which may be used in carrying out the invention;

FIG. 6 is a wiring diagram of the pulse shaper and sampler circuit employed in the motor control system of FIG. 5;

Figure 1:
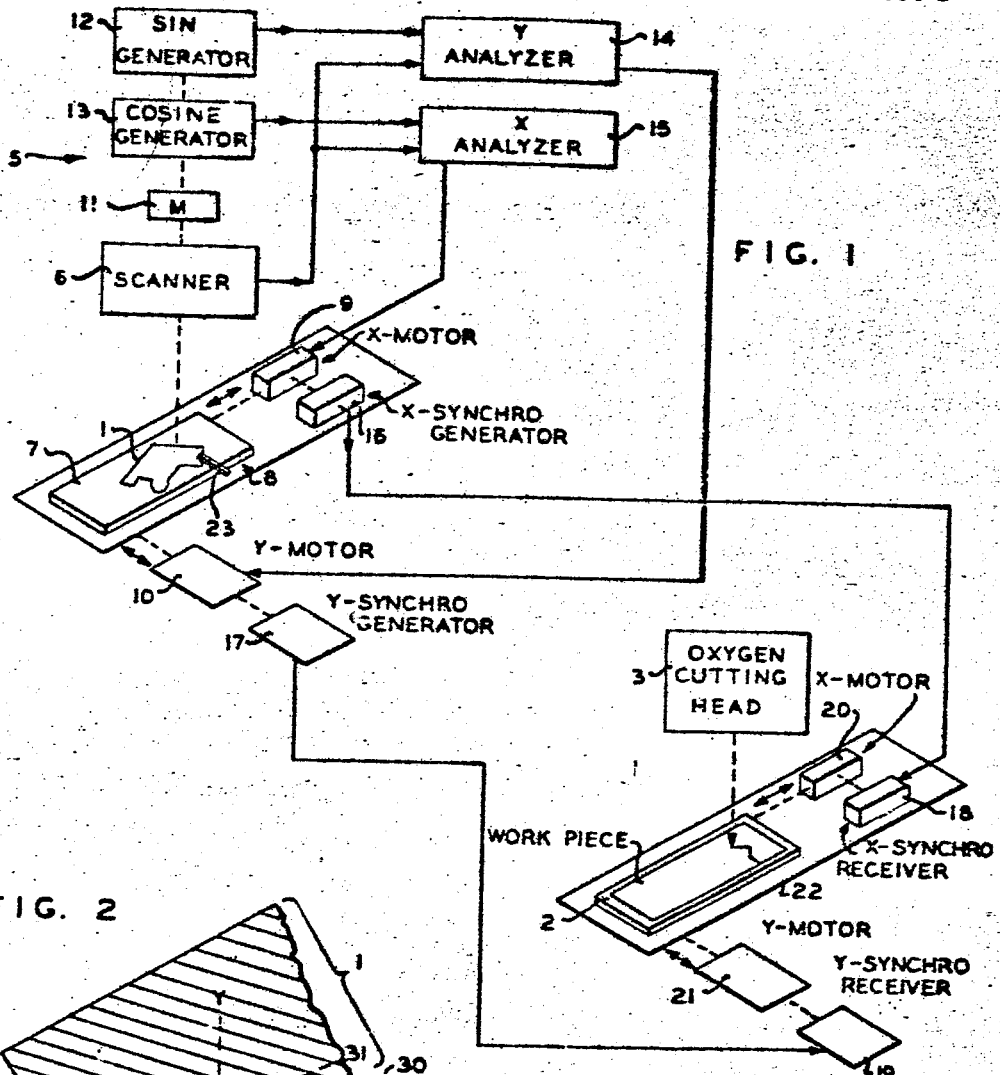
FIG. 1 is a schematic diagram, partly in block form and partly in perspective, illustrating the invention as applied to a tracer for controlling an oxygen cutting machine.

FIGS. 7A, 7B, 7C, 8A, 8B, 8C, 9A, 9B, 9C, 10A, 10B, and 10C are graphical illustrations showing the vectors and sampling potentials employed in the operation of the tracer mechanism of FIGS. 1 to 6;

FIG. 11 is a diagrammatic view illustrating a modified form of scanning mechanism which may be used in place of that illustrated in FIG. 4; and FIG. 12 is a wiring diagram of a sine-cosine generator and other circuits associated with the scanning mechanism of FIG. 11.

FIG. 1

This figure illustrates diagrammatically a tracer constructed in accordance with the invention following a pattern generally indicated by the numeral 1 and controlling the movement of a work table 2 with reference to an oxygen cutting head indicated diagrammatically at 3, so as to cut from a workpiece 4 a part having a contour determined by the pattern 1.

The tracer mechanism is generally indicated at 5 and includes a scanner 6 illustrated in greater detail in FIG. 4. The pattern 1 may be either a line drawing or a template, and is supported on a table 7 which is moved longitudinally with reference to an underlying carriage 8 by a reversible motor 9 hereinafter termed the "X" motor, which is also supported on the carriage 8. The carriage 8 is driven by a reversible motor 10, hereinafter termed the "Y" motor, in a direction at right angles to the direction of movement of the table 8 along the table 7 by the motor 9.

The scanner may be a mechanical device for rotating a beam of light at a constant speed, as described below in connection with FIG. 4, alternatively, it may be a cathode ray tube or iconoscope, equipped with means for rotating a cathode ray so as to scan a light-sensitive screen on which an image of the pattern edge is optically projected. An example of the latter type of scanner is described below in connection with FIGS. 11 and 12.

If the scanner is of the mechanical type described in connection with FIG. 4, it is driven by a motor 11, which also drives a sine generator 12 and a cosine generator 13. Signals produced by the scanner 6 are fed to a Y analyzer generally indicated by the reference numeral 14 and described in greater detail in FIG. 5. The output of the sine generator 12 is also fed to the Y analyzer 14. The output of the scanner 6 is also fed to an X analyzer 15, along with the output of the cosine generator 13. The output of the Y analyzer 14 is fed to and controls the speed and direction of the Y motor 10. The output of the X analyzer 15 is fed to and controls the speed and direction of the X motor 9. The X motor 9 drives a synchrogenerator 16, which may be of the well known Selsyn type. The Y motor 10 drives a Y synchrogenerator 17. The two synchrogenerators 16 and 17 respectively deliver their outputs to synchroreceivers 18 and 19 which control motors 20 and 21. The motor 20 is referred to as an X motor and drives the work table 2 in the X direction on an underlying carriage 22. The Y motor drives the underlying carriage 22 in the Y direction, i.e., at right angles to the X direction.

The scanner 6 and the analyzers 14 and 15 control the motors 9 and 10 so that the pattern 1 moves relative to the scanner in such a fashion that the scanner follows the outline of the pattern. As the motors 9 and 10 drive the pattern table 7, the generators 16, 17 produce at the same time signals which, through the receivers 18, 19, control the motors 20 and 21 so as to drive the workpiece in the same fashion with respect to the oxygen cutting head 3. In this manner, a part shaped like the outline of a pattern is cut from the workpiece 4. By introducing speed increasing gears between motors 9, 10 and generators 16, 17, the motors 20 and 21 may be made to operate on a larger scale, so that the part cut from the workpiece 4 is larger than the pattern 1.

In starting the apparatus to cut a part from the workpiece 4, an elongated guide 23 of any material providing an optical contrast with the background of the pattern 1 is laid down on the table 7, extending between the edge of the table and the outline of the pattern, with its inner end overlapping that outline. In a manner to be described more completely below, the scanner is made to follow the edge of the guide 23 until it intersects the outline of the pattern 1. The cutting head 3 at the same time makes a cut inwardly from one edge of the workpiece until it strikes the outline of the pattern. The scanner thereafter follows the pattern outline and the cutting head 3 reproduces the contour in the workpiece.

The guide 23 is removed after the scanner starts following the outline.

While the apparatus illustrated shows motors 9 and 10 which cooperate to position the pattern table 7 relative to the stationary scanner 6, and alternative arrangement may be used wherein the pattern is held stationary and the motors 9 and 10 position the scanner relative to the pattern.

FIG. 2

This figure illustrates graphically the method of tracing a line in accordance with the invention. This figure is drawn on a considerably enlarged scale to facilitate understanding of the invention.

A portion or stroke of the pattern 1 is presented against a contrasting background 24 which may be the surface of the table 7. The lower edge 1a of the pattern 1 is the line to be traced. The strokes 1 may be an India ink line (illustrated as being 1/16" wide) drawn on tracing paper. Alternatively, it may be the edge of a template. The only essential requirement is that there be a contrast between the optical characteristics of the pattern 1 and the background 24. Although, in the mechanism illustrated, reflected light is employed, an equivalent mechanism could be devised using transmitted or refracted light.

The path scanned by the scanner 6 is shown at 25 as an annulus having a radial width of 0.003" and an overall diameter of 1/16" (0.0625"). The width of the pattern outline 1 should be at least equal to the diameter of the scanned path 25. Light from any suitable external source is reflected from a small circular spot such as that shown at 25a in the drawing on a light sensitive element such as a photocell. The particular spot from which light is reflected to the photocell is moved in a circular path by the mechanism described below in connection with FIG. 4. As it travels in this circular path, it scans the annulus 25 shown in FIG. 2.

The sine generator 12 is synchronized with the mechanism which moves the spot 25a along the path 25. The voltage wave produced by the generator 12 is shown graphically in FIG. 2 at 26. The synchronization of the sine generator 12 with the scanner 6 is such that the spot 25a moves counterclockwise along the path 25 and crosses the X axis to the right of the origin at a time $T_0$.

The output of the photocell or other light sensitive means changes suddenly whenever the spot 25a crosses the line 1a being traced, due to the difference in the optical characteristics of the adjoining areas on opposite sides of the line. These sudden changes in the photocell output are converted by differentiation to pulse signals. On each cycle of complete rotation of the spot 25a around the path 25, two pulse signals are produced. The first, or leading pulse is produced at a time $T_1$ when the spot first crosses the line 1a. The second, or lagging pulse is produced at a time $T_2$ when the spot 25a crosses back over the line 1a. The output potential produced by the sine generator 12 is shown at 26, and its value at any instant is a measure of the sine of the angle between the X axis and the radius extending from the origin to the location of the spot 25a. The output potential of cosine generator 13 is shown at 26a, and its value at any instant is a measure of the cosine of the same angle.

By sampling the signal 26 from the sine generator 12 at the time $T_1$, a potential value $V_1$ is obtained. Similarly, by sampling the sine wave 26 at the time $T_2$, a potential value $V_2$ may be obtained.

The radius 27 drawn to the point where the path 25 first intersects the line 1a, and the radius 28, drawn to the point where the path 25 intersects the line 1a the second time, may be considered as vectors. The sum of these two vectors, which appears in the drawing at 29, may be taken as a measure of the apparent deviation of the center of the scanning circle from line 1a, and hence of the correction or movement required to shift the center of the scanning circle to a point on the line 1a. The difference of the vectors 27 and 28, which appears at 30 in the drawing, is a vector which varies inversely with the vector 29 and has a maximum value equal to twice the radius 27, when the center is on the line 1a. When the center is on the line 1a, the vector 29 is zero.

Figure 2:
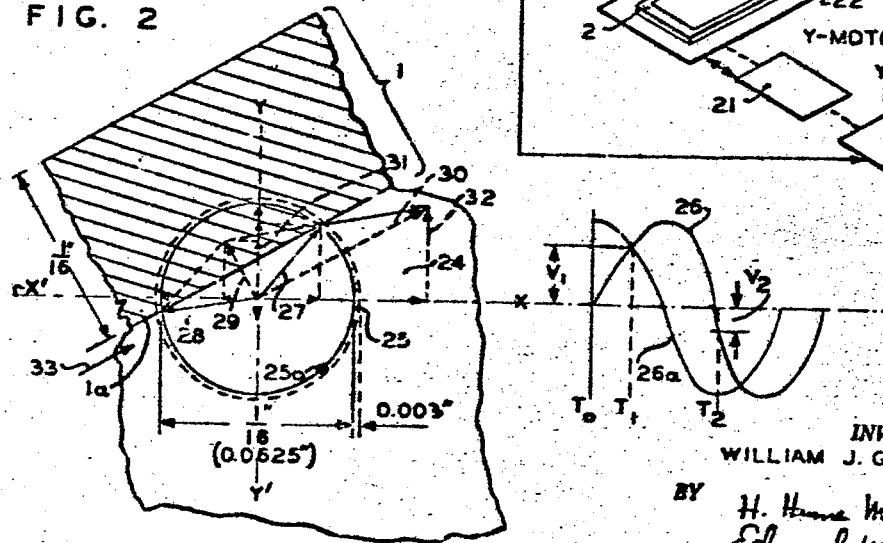
FIG. 2 is a diagrammatic illustration, on a greatly enlarged scale, of the scanning path associated with an edge to be traced, and illustrating the various vectors and components used in the analysis of the signals to control the tracer mechanism.

By adding algebraically the potential values $V_1$ and $V_2$, a potential signal may be obtained having a value indicated at 31 in FIG. 2, which measures the Y component of the error vector 29. This potential signal is hereinafter referred to as the sum signal. By subtracting algebraically the potential $V_2$ from the potential $V_1$, a signal measured by the vector 32 is obtained, which signal measures the Y component of the inverse vector 30. This potential signal is hereinafter referred to as the difference signal. In the method of tracing a line in accordance with the present invention, the sum signal 31 and the difference signal 32 are used to control the speed of travel of the Y motor 10. When the center of the circle or optical axis is on the line 1a, the sum signal 31 is zero and the difference signal controls the motor speed at a value to maintain a preset resultant velocity of the tracer along the line 1a. When the optical axis is off the line 1a, the sum signal has a value other than zero and introduces a correction in the speed of the Y motor in the proper sense to restore the optical axis to a position on the line 1a. The difference signal 32 is also modified by the departure of the optical axis from the line 1a, the modification being in the proper sense to introduce a further correction in the speed of the Y motor.

In the situation illustrated in FIG. 2, the Y motor 10 is driving the carriage 8 downwardly as viewed in FIG. 2 and the X motor 9 is driving table 7 to the left as viewed in FIG. 2, the two motors cooperating to keep the optical axis travelling along the line 1a in the direction indicated by the arrow 33. The corrections introduced by the error signal and by the modification of the difference signal are both in a sense to increase the speed of the Y motor in the same direction in which it is travelling, so as to carry the line 1a more rapidly downward and to bring the line 1a into alignment with the optical axis.

The cosine generator 13 produces a cosine wave 26a similar to the sine wave 26 except that it is advanced in phase by one-quarter cycle. The sampling of the cosine wave produces voltage signals which are added and subtracted to produce sum and difference signals used to control the X motor 9. The control of the X motor is exactly analogous to the control of the Y motor, which will be more completely described below.

The method of sampling the sinusoidal waves and adding and subtracting the respective components has been described in connection with FIG. 2 as taking place in the following sequence: (1) sampling of sine wave to get $V_1$; (2) sampling of sine wave to get $V_2$; and (3) addition or subtraction of $V_1$ and $V_2$ to get sum and difference signals. This is perhaps the most logical sequence for the three steps. However, it is by no means the only sequence which may be employed.

As will become apparent from a consideration of FIG. 5, below, the apparatus there described operates in a different sequence, i.e.: (1) sampling of sine wave to get $V_1$; (2) adding and subtracting of $V_1$ and sine wave to get composite waves measuring sum and difference at each instant; and (3) sampling of composite waves to get sum and difference signals.

Figure 5:
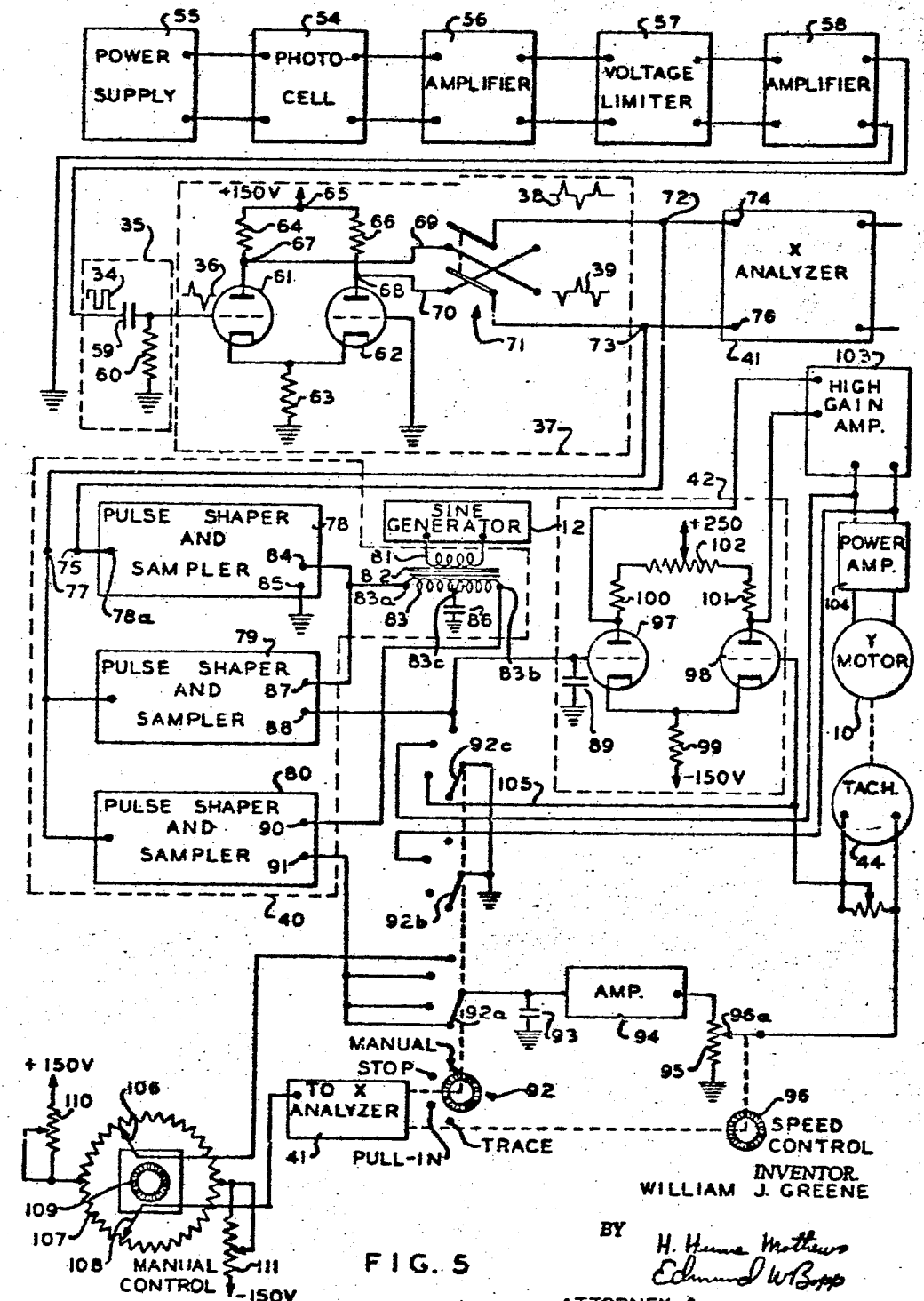
FIG. 5 is a diagrammatic illustration, showing the wiring diagram of the control system for one of the two motors in the improved tracer mechanism.

This particular sequence of FIG. 5 and the apparatus for performing it are important features of the present invention, since the circuitry for performing the computation is thereby greatly simplified. However, the broader aspects of the invention are not limited by any specific apparatus nor by any specific sequence of events in the computation of the sum and difference signals.

FIG. 3

This figure is a block diagram indicating the flow of signals and control voltages from the sine and cosine generators 12 and 13 and from the scanner 6 to the Y motor 10 and the X motor 9. Only the principal parts of the tracer apparatus are indicated in FIG. 3, other parts being shown in greater detail in FIG. 5 and other figures.

Figure 3:
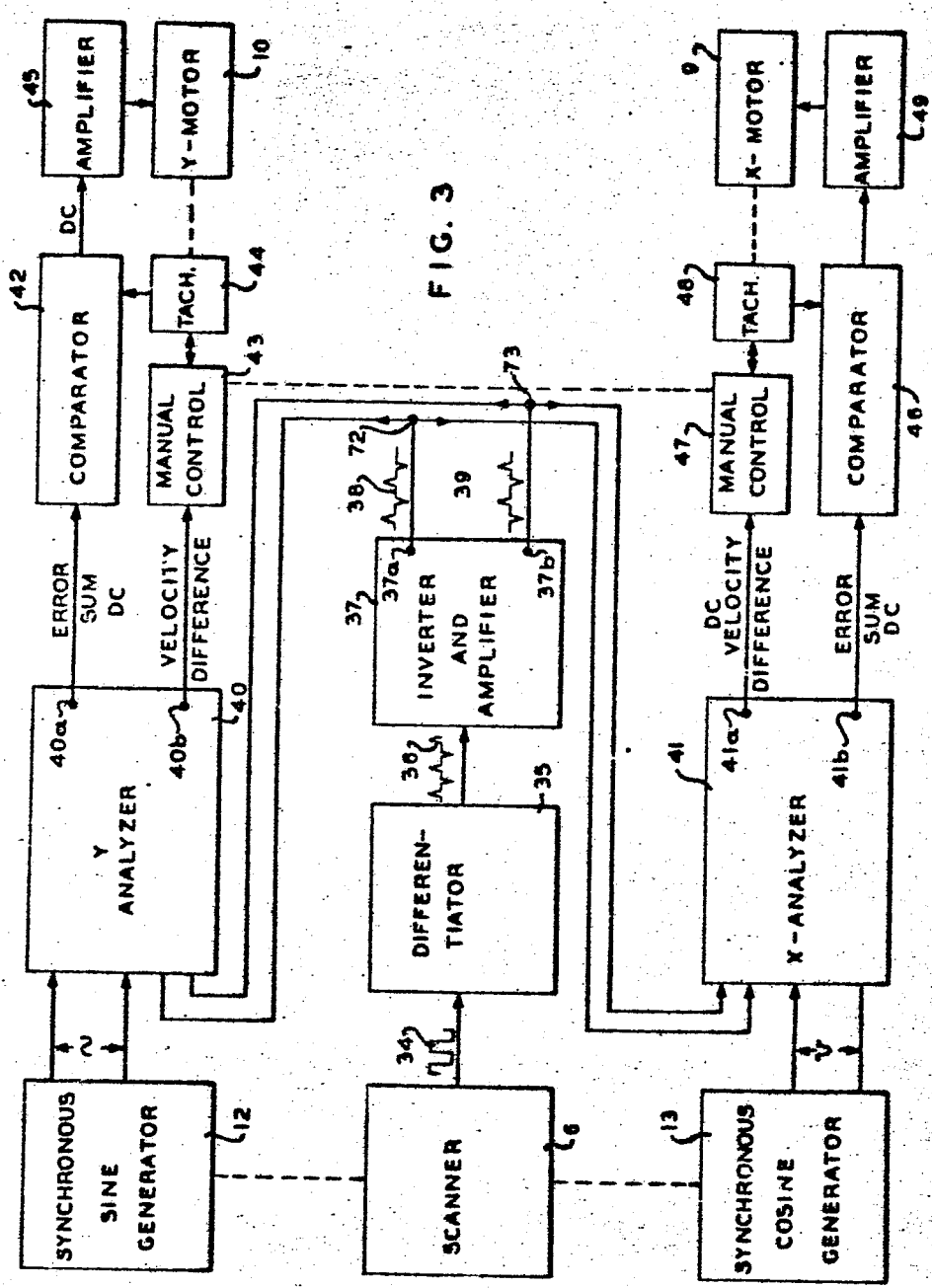
FIG. 3 is a block diagram of the complete tracer mechanism.

The scanner 6 produces a square wave signal indicated at 34 in FIG. 3, with the tops of the square waves representing reflection reaching the photocell from the line 1 and the bottoms representing reflection from the background 24, or vice versa.

The square wave 34 from the scanner 6 may be amplified and corrected as described below in connection with FIG. 5. After such amplification or correction is made, it is fed into a differentiating circuit 35. The signal appears at the output of that circuit as a sharply peaked wave 36, having alternate positive and negative peaks. The signal wave 36 is fed to an inverter and amplifier generally indicated at 37 having two output terminals 37a and 37b. The signal appears at the output terminal 37a as a sharply peaked wave 38 which is in phase with the input wave 36. At the output terminal 37b, there appears an inverted wave 39 of the opposite phase to the wave 38, but otherwise similar. The output terminals 37a and 37b supply their direct and inverted outputs to a Y analyzer 40 and an X analyzer 41. The Y analyzer is described more completely in connection with FIG. 5. The output of the sine generator 12 is also supplied to the Y analyzer 40. The output of the cosine generator 13 is supplied to the X analyzer 41.

The Y analyzer 40 produces two output signals at two output terminals 40a and 40b. The output signal at terminal 40a is a D.C. potential corresponding in value to the potential signal 31 of FIG. 2, and is termed the error signal. It represents the algebraic sum of the Y components of the displacement measuring vectors 27 and 28 (FIG. 2). The signal appearing at terminal 40b is also a direct potential, and is hereinafter referred to as the velocity signal or difference signal. It corresponds to the potential 32 of FIG. 2, and is a measure of the algebraic difference of the Y components of the displacement measuring vectors 27 and 28.

The error or sum signal from terminal 40a passes directly to a comparator 42. The difference signal from terminal 40b passes through a manual control device 43 and is connected in series opposition to the output of a tachometer 44 driven by the Y motor 10 and measuring the speed of that motor. The net signal from this series circuit is the algebraic sum of these two opposed signals. This algebraic sum is supplied to the comparator 42, and is hereinafter termed the velocity control signal. When the optical axis is on the line 1a, the error signal zero and this velocity control signal is the only signal supplied to comparator 42. When the optical axis is off the line 1a, an error signal is produced which may aid or oppose the velocity control signal from the tachometer and terminal 40b. The resultant of the signals supplied to the comparator 42 is fed to an amplifier 45 which controls the supply of current to the Y motor 10. The motor 10 may be a split phase motor, with one phase supplied directly from power lines and the other phase supplied through the amplifier 45. The amplifier 45 may desirably consist of several stages, including preliminary stages of high gain amplification and final stages of power amplification.

The control system for the X motor 9 is similar to that for the Y motor 10. That control system includes a comparator 46, a manual control 47 and a tachometer 48. The power supplied to motor 9 is controlled by a comparator 46 through an amplifier 49.

FIG. 4

This figure illustrates diagrammatically one form of scanner and photocell pickup, which may be the scanner 6 of FIGS. 1 and 3.

The motor 11 which drives the sine generator 12 and cosine generator 13 also drives a nutating mirror 50. The mirror is set at a slight angle (approximately 1°) with respect to its rotating shaft. One side of the mirror is aligned through an optical lens system 51 with an optical axis 52 which intersects the table 7 at an angle, usually a right angle. Light from any suitable source such as shown at 53, is directed on the table 7. Light from the table 7 is reflected through the optical system 51 to the mirror 50 and thence to a photocell 54. As the mirror rotates, the spot on the table 1 from which light is reflected to the photocell 54 moves in a circular path, such as the path 25 of FIG. 2.

Alternatively, as mentioned above, the light may pass through transparent and opaque areas of the pattern, instead of being reflected.

FIG. 5

The photocell 54 may be of any suitable type, for example, the cascaded secondary emission type. That photocell is provided with energy from a power supply 55. The output of the photocell may be amplified by an amplifier 56 and then passes through a voltage limiter 57 which squares the tops and bottoms of the wave signals so as to produce a clear and sharp signal without interference signals from external sources. The output of the limiter 57 is amplified by another amplifier 58 and then passes to a differentiator 35 of conventional construction, including a capacitor 59 and a resistor 60 connected in series. The square wave input signal 34 to the differentiator is transformed to the peaked output signal 36 appearing across the resistor 60. This signal 36 is supplied to the inverter and amplifier 37. The amplifier 37 comprises two triodes 61 and 62 having their cathodes connected through a common load resistor 63 to ground. The grid of triode 61 receives the input signal 36. The grid of triode 62 is connected to ground. The anode of triode 61 is connected through a load resistor 64 to a positive potential supply terminal 65, indicated as being 150 volts. The anode of triode 62 is connected through a resistor 66 to terminal 65. The anodes 61a and 62a are also connected directly to junctions 67 and 68 respectively, which are in turn connected through wires 69 and 70 to a reversing switch generally indicated by the reference numeral 71, which connects the wires 69 and 70 selectively to output terminals 72 and 73. In one position of the switch 71, wire 69 is connected to terminal 72 and wire 70 is connected to terminal 73. In the opposite position of switch 71, wire 69 is connected to terminal 73 and wire 70 to terminal 72. The position of the reversing switch 71 determines the direction in which the tracer follows the pattern. For example, if the pattern is a closed loop, the tracer will follow the pattern clockwise around the loop when the switch 71 is set in one position and will follow it counterclockwise if switch 71 is set in another position. This selection of the loop direction will be explained in greater detail below. Terminal 72 is connected to an input terminal 74 of the X analyzer 41 and to an input terminal 75 of the Y analyzer 40. Similarly, output terminal 73 is connected to an input terminal 76 of X analyzer 41 and an input terminal 77 of the Y analyzer 40.

Input terminal 75 is connected to the input of a pulse shaper and sampler circuit 78 shown and described below in detail in connection with FIG. 6. Input terminal 77 is connected in parallel to the input terminals of two pulse shaper and sampler circuits 79 and 80, similar in their construction details to the circuit 78 illustrated in FIG. 6.

The sine generator 12 is connected to the primary winding 81 of a transformer 82 having a secondary winding 83. Winding 83 is provided with end terminals 83a and 83b and a center tap 83c.

Terminal 83a of winding 83 is connected to an output terminal 84 of sampler 78. Another output terminal 85 of sampler 78 is connected to ground. Center tap 83c of winding 83 is connected through a capacitor 86 to ground.

It may be seen that the winding 83 supplies to the output terminals 84 and 85 a sine wave. This wave is sampled by the sampler 78 at intervals determined by the instant when the spot 25a (FIG. 2) crosses the line 1a in the leading phase of the cycle. The sampler circuit 78 operates to block the flow of current through its output terminals 84 and 85 except during the instant when a pulse signal input is received. Consequently, the sampler serves to build up and maintain on the capacitor 86 a potential charge which measures the Y component of the vector 27 in FIG. 2.

It should be understood that the scanning frequency is high compared to the speed of movement of the tracer along the line 1a. For example, the scanning frequency may be 400 cycles for a linear velocity in the neighborhood of five or six feet per minute along the line 1a. With this relationship of the scanning frequency to the speed of travel of the tracer, it will be understood that the potentials representing the various vectors and their components do not change rapidly from one cycle to the next. The potential on capacitor 86 is averaged over several cycles. If there is any change in the alignment between the optical axis and the line 1a, it appears gradually on capacitor 86, due to the averaging effect.

The pulse shaper and sampler 78 cooperates with sine generator 12 to establish between the terminal 83a and ground a composite potential consisting of the sum of the sine wave and the D.C. potential built up on the capacitor 86.

The sampler 79 as one output terminal 87 connected to secondary winding terminal 83a and another output terminal 88 connected through a capacitor 89 to ground. The branch circuit including in series the internal impedance between the terminals 87 and 88 and the capacitor 89, has impressed across it the composite potential described above as appearing between terminal 83a and ground. The sampler 79 samples that composite potential at intervals determined by the peaks produced on the lagging phase of the cycle when the spot 25a crosses the line 1a. The potential of the composite wave at these instants is a measure of the algebraic sum of the Y component of vector 27 and the Y component of vector 28, (see FIGS. 7-10 below). In other words, it corresponds in FIG. 2 to the value of the Y component 31 of the resultant sum vector 29. This sampled signal is built up on capacitor 89 over several cycles in the same manner that the signal was built up on capacitor 86. This is the signal referred to as the "error" signal or the "sum" signal.

In a similar fashion, the pulse shaper and sampler 80 has one output terminal 90 connected to terminal 83b of secondary winding 83, and another output terminal 91 connected through a switch finger 92a to be described in greater detail below and a capacitor 93 to ground.

The secondary winding 83 and the capacitor 86 cooperate to build up between the terminal 83b and ground a composite potential which is the sum of the inverse phase of the sine wave and the D.C. potential on capacitor 86. This composite potential is sampled by the sampler 80 at the same instant at which the sampler 79 is actuated, namely at the times marked by the lagging pulses. When the switch 92a is closed, this sampled potential is built up over several cycles on the capacitor 93. Since the sampling which charges capacitor 86 takes place on the opposite phase of the sine wave from that which charges capacitor 93, the signal produced on capacitor 93 is a measure of the difference of the Y components of vectors 27 and 28. Referring to FIG. 2, this potential is a measure of the length of the Y component 32 of the difference vector 30. The signal on capacitor 93 is referred to as the "difference" signal.

The signal appearing on capacitor 93 is amplified by an amplifier 94, whose output is connected to a variable resistor 95 having a movable contact controlled by a speed control knob 96, which may be manually operated. The speed control knob 96 selects a proportion of the total signal appearing at the output of amplifier 94. The signal between the movable contact 96a and ground is bucked against the output signal of tachometer 44 which is driven by the Y motor 10. The difference between these two signals, which difference is hereinafter referred to as the velocity control signal, is delivered to the comparator 42.

Comparator 42 comprises two triodes 97 and 98. The cathodes of the two triodes are connected through a cathode load resistor 99 to a source of negative potential, shown as −150 volts. The anodes of triodes 97 and 98 are connected through resistors 100 and 101 respectively to the opposite terminals of a balancing resistor 92, having a movable contact connected to a source of positive potential, indicated as +250 volts. The grid of triode 97 is connected to the ungrounded terminal of capacitor 89. The grid of triode 98 is connected to the series circuit in which the output of tachometer 44 is balanced against the modified velocity signal appearing at contact 96a.

When the optical axis is aligned with the line 23a, the error signal appearing across capacitor 89 is zero. This is the desired normal condition of operation of the tracer. At this time, the signal appearing between contact 96a and ground is a maximum. This signal acts through the comparator 42 to provide a signal to the high gain amplifier 103 and thence through the power amplifier 104 to increase the speed of the Y motor 10 until a balanced condition is reached such that the tachometer output balances most of the difference signal at 96a. The unbalanced signal reaching comparator 42 is just enough to maintain the control loop including comparator 42, the amplifiers motor 10 and tachometer 44 in a stable state.

Note, in comparator 42, that the cathode load resistor 99 produces an inverse operation of the two triodes 97 and 98. In other words, if the current through one of the triodes tends to increase in response to a positive going signal on its grid, that increase in current will increase the potential drop across the cathode resistor 99, thereby driving both the cathodes more positive and decreasing the current flow through the opposite triode.

Due to the high negative potential to which the cathode resistor 99 is connected, the cathodes normally operate below ground potential, and substantial current is normally conducted by both triodes 97 and 98, even though their grids are at substantially zero potential. In fact, the circuit may be so designed and operated so that when the optical axis is aligned with the line 1a, the velocity control signal at the grid of triode 98 is zero, since the tachometer 44 may balance completely the signal at contact 96a. The circuit need not of course necessarily operate at this particular balance point, but will operate usually somewhere in that neighborhood. Nevertheless, the current conducted by the triodes 97 and 98 keeps the motor running at a substantial speed. When an error signal appears across capacitor 89, it modifies the current flow through triode 97 and produces an inverse effect in the triode 98. The operation is such that the incoming signal produces very quickly a substantial variation in output from the comparator 42, enabling the motor to make a rapid response and to correct quickly any error in the position of the optical axis. The knob 96 operates a similar speed selector device (not shown) in the X analyzer 41, as indicated by the dotted line connecting those elements in FIG. 5.

*Manual control*

The switch finger 92a, mentioned above, is one of three fingers 92a, 92b, 92c of a manually operated switch 92. These three switch fingers are associated with the Y analyzer 40. The switch 92 also operates three fingers associated with the X analyzer 41, the latter fingers not being shown in the drawing.

The switch 92 has four positions identified by legends in the drawing as "manual," "stop," "pull-in" and "trace."

The fingers are shown in the trace position which is is the position used when the system is actually tracing a line. When the system is in the "pull-in" position, the only change from the "trace" position is that the grid of triode 98 is grounded through wire 105 and switch finger 92c. Under those conditions, the only signal reaching the comparator 42 is the error signal. The "pull-in" position of switch 92 is utilized when starting to trace a pattern. When the switch 92 is in the "pull-in" position, there is no velocity signal reaching the comparator 42. Consequently the tracer will approach the pattern line 1 or the guide 23 until the line is reached. When that line is reached, the error signal is reduced to zero, and the tracer stops. The operator can then select either direction (clockwise or counterclockwise) of tracing movement by means of the reversing switch 71 and can then move the switch 92 to the trace position, whereupon the tracing operation will be completed. Usually, the cutting torch will not be operated during the pull-in operation, but will be started after the tracer has "pull in," but before the switch 92 is thrown to the trace position.

In the stop position of the switch 92, both input terminals of the power amplifier 104 are grounded through the switch fingers 92b and 92c. This completely cuts off the power to one phase of the motor thereby stopping it.

In the "manual" position of switch 92, the grid of triode 97 is connected to ground through switch finger 92c. At the same time, the output of the sampler circuit 80 is disconnected from capacitor 93, and that capacitor is connected through switch finger 92a to a sliding contact 106 associated with a circular resistor 107. Contact 106 and a companion contact 108 are slidable concurrently along the resistor 107 by means of a knob 109. One point on resistor 107 is connected through a variable resistor 110 to the positive terminal of a potential supply indicated as +150 volts. The diametrically opposite point on resistor 107 is connected through a variable resistor 111 to a negative potential supply, indicated as −150 volts.

The two contacts 106 and 108 engage the resistor 107 at points 90° apart. Contact 108 supplies a signal to the X analyzer 41 similar to that supplied to the Y analyzer through contact 106.

When the switch 92 is in the manual position, the manual control knob 109 may be used to provide signals to the respective motors so as to steer the driven element of the tracer mechanism to any desired position with respect to the stationary element.

FIG. 6

Pulse shaper and sampler circuit

The circuit of this figure may be any one of the pulse shaper and sampler circuits 78, 79 and 80 of FIG. 5. For purposes of example only, it will be assumed to be the circuit 78, having an input terminal 78a and output terminals 84 and 85.

The circuit of FIG. 6 consists of a pulse shaping stage 112 and a sampling stage 113. The pulse shaping stage 112, which may be described as a blocking oscillator comprises the two triodes 114 and 115. The purpose of the pulse shaping stage is to convert the peaked input pulses to pulses which are even more sharply peaked and have a greater amplitude. The input terminal 78a is connected through a capacitor 116 and resistors 117 and 118 to ground. A capacitor 119 bypasses the resistor 118. Another resistor 120 connects the common terminal of resistors 117 and 118 to a source of biasing potential, shown as −150 volts. The common terminal of capacitor 116 and resistor 117 is connected to the grid of triode 114.

The cathodes of the two triodes 114 and 115 are grounded. The anodes of the two triodes are connected together through a wire 121 and to one terminal of the primary winding 122 of a transformer 123. The other terminal of primary winding 122 is connected through a resistor 251 to the positive terminal of a source of potential, indicated as +150 volts.

The winding 122 is shunted by a diode 252 whose polarity is opposite to that of triode 114. A capacitor 253 is connected between the cathode of diode 252 and ground. The transformer 123 has a feedback winding 254 having one terminal connected to the grid of triode 115 and its opposite terminal connected through a resistor 128 and a bypass capacitor 255 to ground. That opposite terminal of winding 254 is also connected through a resistor 256 to a source of biasing potential indicated as −150 volts.

When a peaked signal is received at terminal 78a, it is applied to the grid of triode 114 and produces a steep output pulse in the primary winding 122. This pulse is fed through winding 254 to the grid of triode 115, which also becomes highly conductive, and the output of triode 115 reinforces the steeply increasing wave in winding 122. When the peaked input at terminal 78a changes from its positively-going to its negative-going phase, the diode 125 becomes effective to shunt the winding 122, so that the current pulse through that winding terminates very quickly. A very sharply peaked pulse is therefore applied to winding 122.

The transformer 123 is also provided with secondary windings 124 and 125 which provide inputs for the sampler circuit 113. This circuit includes triodes 126 and 127 connected back-to-back, i.e., with the cathode of each triode connected to the anode of the opposite triode.

The grid of triode 126 is connected to a junction 328 and thence through a coupling resistor 129 and a parallel capacitor 130 to one terminal of winding 124. The opposite terminal of winding 124 is connected to the anode of triode 126 and the cathode of triode 127, and also to the output terminal 84.

The grid of triode 127 is connected to a junction 228 and thence through a coupling resistor 131 and a parallel capacitor 132 to one terminal of secondary winding 125. The opposite terminal of winding 125 is connected to the cathode of triode 126 and the anode of triode 127.

On any half cycle applied between the terminals 84 and 85, one or the other of the triodes 126 and 127 is supplied with an anode-cathode potential of the proper polarity so that it may become conductive. During such a half cycle, if a sharply peaked pulse is received at the grid having a polarity such as to make the grid positive with respect to the cathode, then the triode will become conductive and will sample the applied wave, sending a current impulse through the terminals 84 and 85, and thereby charging the capacitor connected in series with those terminals. In the present example, the capacitor in question is 86.

Note that the pulse shaper or blocking oscillator 112 responds only to input pulses of one polarity (positive). It does not respond to negative input pulses. Consequently it samples the sine wave only on the leading signal pulses of input signal 38. The secondary windings 124 and 125 are connected so that one may be effective on any half-wave to supply to the grids a potential of proper polarity to render one of the triodes 126 and 127 conductive.

The pulse shaper and sampler circuits 79 and 80 receive the inverted signal 39 instead of the signal 38, and so sample the waves applied to their output terminals only on the lagging signal pulses.

The apparatus treats positive pulses at the input of pulse shaper and sampler 78 as leading pulses, and determines the direction of operation of the Y motor 10 accordingly. The X motor is similarly controlled. Consequently, by operating the reversing switch 71 to transmit the inverted signal 39 to the sampler 78 and the non-inverted signal 38 to samplers 79 and 80, the direction of operation of motor 10 in response to any given signal is reversed. The direction of motor 9 is also reversed, so that the tracer follows the line 1 in the opposite direction.

FIGS. 7A, 7B, 7C, 8A, 8B, 8C

*Operation of Figs. 5 and 6*

These figures correspond generally to graphical FIG. 2, and the reference numerals employed herein are consistent with those in FIG. 2.

In FIGS. 7A, 7B and 7C, the tracer is considered to be following a line 23a in a direction indicated by the arrow 33. The optical axis 52 is aligned with the line 23a. The spot 25a is moving counter-clockwise about the scanning circle. This figure illustrates the operation of the Y analyzer 40 in these conditions. As the spot 25a passes the edge of the line 23a, a leading pulse is produced and the sine wave 26 is sampled by the sampler circuit 78 at an instant when its potential is at the value $V_3$. This potential is stored on capacitor 86.

The potential $V_3$ stored on capacitor 86 cooperates with the sine wave introduced in winding 83 to produce between terminal 83a and ground a composite potential illustrated at 134 in FIG. 7B, which represents the sum of the sine wave 26 and the potential value $V_3$. This composite signal is sampled by sampler 79 at the instant marked by the point 133 as illustrated in FIG. 7A. The composite wave is passing through zero at that point so that a zero signal is produced on the capacitor 89. In other words, as shown in FIG. 7B, the two vectors 27 and 28, representing the leading and lagging intersections of the scanning path with the line 23a, have Y components which are equal and opposite, so that their algebraic sum is zero.

The pulse shaper and sampler 80 on the other hand samples at time 133 a composite signal shown at 135 in FIG. 7C consisting of the potential $V_3$ added to the opposite phase of the sine wave. At the instant 133, that wave has a value substantially equal to twice $V_3$. This value represents the vector difference of the Y components of the vectors 27 and 28. As is well known, the difference of two vectors is obtained by reversing one of the two vectors and then adding vectorially, as illustrated in FIG. 7C.

In FIGS. 8A, 8B and 8C, the optical axis 52 is displaced from the line 23a which is being followed. The tracing is still in the direction of the arrow 33. The leading pulse samples the sine wave 26 at the time 136, producing a potential $V_4$ which is stored on the capacitor 86. The composite wave applied to the output terminals of sampler 79 is illustrated at 137 and represents the sum of the sine wave 126 and the potential $V_4$. When the wave 137 is sampled at the time 138 determined by the vector 28, the potential then existing has a value of $V_5$. As illustrated in FIG. 8B, this value is the Y component of the vector sum of the vectors 27 and 28. This potential is stored on capacitor 89 and represents an error signal in the Y direction.

A composite signal 139, which is the sum of potential $V_4$ and the opposite phase of the sine wave, is applied to the sampler 80, and is sampled at the time 138, resulting in a potential $V_6$ which is stored on capacitor 93. This potential is a measure of the Y component of the difference of the vectors 27 and 28.

FIGS. 9A, 9B, 9C, 10A, 10B AND 10C

These figures illustrate the operation of the X analyzer 41. This operation is similar to that just described for the Y analyzer except that the sinusoidal wave utilized is the cosine wave 26a, instead of the sine wave 26. It may be seen that the cosine wave 26a is displaced 90° in time phase from the sine wave 26 of FIG. 7.

In FIGS. 9A, 9B, 9C, the optical axis 52 is on the line, which is being traced in the direction of the arrow 33. The cosine wave 26a is sampled at the time 141 when the leading pulse signal is produced, thereby obtaining a potential $V_7$. This potential $V_7$ is added to the cosine wave 26a to produce a composite sinusoidal signal 142. The signal 142 is sampled at the time 143, at which instant it is passing through zero so that the vector sum of the X component of the two vectors 27 and 28 is zero.

In a similar fashion, the opposite phase of the cosine wave 26a is added to the potenial $V_7$ to provide a composite wave 144. The wave 144 is sampled at the time 143 to produce a potential $V_8$, which measures the X component of the vector difference of the vectors 27 and 28.

FIG. 10 illustrates the operation of the X analyzer 41 when the optical axis 52 is off the line 1a. The cosine wave 26a is sampled at time 145 of the leading pulse, thereby determining a potential $V_9$ which measures the X component of the vector 27. The potential $V_9$ is added to the wave 26a to produce a composite wave 146. The latter wave is sampled at the time 147, thereby obtaining a potential $V_{10}$ which represents the X component of the sum of the vectors 27 and 28.

In a similar fashion, the composite wave 148 is obtained from the sum of the potential $V_9$ and the cosine wave 26a in the opposite phase. The wave 148 is sampled at the time 147, thereby deriving a potential $V_{11}$ which measures the X component of the difference of the vectors 27 and 28.

It may be observed that in either analyzer, the sum signal varies directly with the apparent deviation, i.e., the displacement of the optical axis from the line being traced. This is referred to as the apparent deviation, because if the line being traced is curved or angular, the optical axis may be on the line, but nevertheless a deviation will be indicated and sum and difference signals will be obtained, because the intersections of the circular scanning path with the line are not diametrically opposite.

It should be remembered, as pointed out above, that the difference signal which is utilized to control the velocity of the motor, varies inversely with the apparent error. Note also that this variation is rather small for small apparent errors. The difference signal varies with the cosine of the angle between the vectors 27 and 28. Those vectors are normally 180° apart when the optical axis is on the line. Unless the two vectors depart from their normal relationship by as much as 45°, there is relatively little change in the velocity signal, since it is a cosine function of the angle. Consequently, the speed of the motor is not reduced substantially in response to minor apparent deviations. However, if the machine is tracing a sharp curve or angle, the cosine function from which the velocity signal is derived will show a large variation, and the motor speed will be correspondingly reduced to allow the tracer to move around the curve or angle at a reduced speed. Also, if there is a major error in the position of the optical axis, a similar reduction in speed occurs which allows the error to be corrected in a relatively short distance along the perimeter of the pattern being traced.

In any position or direction of movement of the tracer, when there is no apparent deviation, the resultant of the velocities of the X and Y motors is fixed by the setting of the manual velocity control device 96. This resultant is the linear speed of the tracer along the pattern. This linear speed may be set manually at its optimum value. When so set, the apparatus will reduce that speed only as necessary to negotiate curves or correct errors, and will not exceed that speed.

FIGS. 11 AND 12

FIG. 11 shows an optical system for the tracer which may be used in place of the optical system of FIG. 2.

In this system, the line 1 is scanned by an optical system including a television camera tube such as an iconoscope, indicated schematically at 150. The light from the table 7 and pattern 1 is reflected through an optical system of lenses 151 onto a photo-sensitive screen 152 in the tube 150. An electron gun 153 in the tube 150 directs a cathode ray through a set of conventional focusing plates and through a set of deflector plates generally indicated at 154 and shown in greater detail in FIG. 12, as including two pairs of opposed plates 155, 156 and 157, 158, each pair being set at right angles to the other.

The deflector plates 154 are supplied with sine and cosine signals derived from a sine and cosine generator generally indicated by the reference numeral 159. When so supplied, the deflector plates 154 are effective to move the cathode ray from the gun 153 in a circular path. It is essential for the accuracy of the tracer that the cathode ray scanning path be exactly circular. For that purpose, the sine and cosine potentials applied to the deflector plates 154 must be closely controlled. Undesirable noise components and phase shifts in the potentials applied to the deflector plates must be avoided.

The sine and cosine generator 159 is a circuit which can produce the signals for the deflector plates in accurately phased relation and with accurately controlled amplitudes.

The generator 159 is essentially an oscillator circuit. It consists of a first amplifier stage 160 of the push-pull type having an output connected through a phase shifting bridge 161 to the input of a second push-pull amplifier stage 162. The output of stage 162 is connected through another phase shifting bridge 163 back to the input of stage 159. The sense of the phase shift introduced by the bridge 161 is the reverse of the phase shift introduced by the bridge 163, so that the stage 160 and stage 162 are tied to each other in a fixed phase relation at both their outputs and their inputs. As a result, the phase relationship between the two stages 160 and 162 is extremely stable. Also, the two phase shifting bridges 161 and 163 consists of resistance and capacitance elements only. Such elements are obtainable with their impedance values much more closely determined than is the case with inductive elements. Consequently, the frequency of the generator and the angle of the phase shift can be more closely held with impedance elements of those types.

It may be observed that the reversed phase relationship between the two phase shifts introduced by the bridges 161 and 163 is essential. In the vacuum tube amplifier stages 160 and 162, there is a phase reversal between the inputs and the outputs, as is common in vacuum tube circuits. If these two stages were replaced by equivalent transistor stages having no phase reversals between their inputs and their outputs, it would still be necessary to maintain the same reversed phase relationship between the phase shifts introduced by the bridges 161 and 163.

Considering the generator 159 in more detail, it may be seen that the stage 160 comprises two triodes 164 and 165 having cathodes connected through resistors 166 and 167 and a common resistor 168 to ground. The resistors 166 and 167 are variable having sliding contacts 166a and 167a connected together by a wire 169 and movable concurrently by means of a knob 170. The anodes of the triodes 164 and 165 are connected to opposite ends of the primary winding 171 of a transformer 172. Winding 171 has a center tap connected to a positive potential supply, indicated as being 250 volts.

Transformer 172 has a secondary winding 173 provided with a center tap connected through a resistor 174 to a positive potential supply indicated as 150 volts, and also connected through a resistor 175 and a parallel capacitor 176 to ground. The end terminals of winding 173 are connected to the input terminals 177 and 178 of the phase shifting bridge 161. The bridge 161 has output terminals 179 and 180, and comprises a capacitor 181 connected between input terminal 177 and output terminal 179, a resistor 182 connected between input terminal 177 and output terminal 180, a capacitor 183 connected between input terminal 178 and output terminal 180 and a resistor 184 connected between input terminal 178 and output terminal 179.

The stage 162 comprises two triodes 185 and 186 having their grids respectively connected to the output terminals 179 and 180 of the bridge 161. The cathodes of the triodes 185 and 186 are connected through resistors 187 and 188 and a common resistor 189 to ground. The resistors 187 and 188 are variable, having sliding contacts 187a and 187b connected together by a wire 190 and operated concurrently by a knob 191. The anodes of the triodes 185 and 186 are connected to the opposite terminals of a primary winding 192 of a transformer 193. Winding 192 has a center tap connected to a source of positive potential indicated as 250 volts.

Transformer 193 has a secondary winding 194 having a center tap connected through a resistor 195 to a source of positive potential indicated as 150 volts and also connected through a resistor 196 and a parallel capacitor 197 to ground. The terminals of the secondary winding 194 are connected to the input terminals 198 and 199 of the phase shifting bridge 163. Bridge 163 also has output terminals 200 and 201, and comprises a resistor 202 connected between input terminal 198 and output terminal 200, a capacitor 203 connected between input terminal 198 and output terminal 201, a capacitor 204 connected between input terminal 199 and output terminal 200, and a variable resistor 205 and a fixed resistor 206 connected in series between input terminal 199 and output terminal 201. The output terminals 201 and 200 are respectively connected to the grids of the triodes 164 and 165.

The anodes of the triodes 164 and 165 are also connected through a balanced potential adjusting network 207 to the deflector plates 155 and 156 of the cathode ray tube 150. The anodes of the triodes 185 and 186 are similarly connected through a balanced adjusting network 208 to the deflector plates 157 and 158.

The network 207 comprises fixed resistors 209 and 210 and variable resistors 211 and 212. The resistors 209 and 211 are connected in series. The resistors 210 and 212 are connected in series. The two series groups are connected in parallel between wires 213 and 214. A wire 215 connects the common terminal of resistors 209 and 211 to the common terminal of resistors 210 and 212. The sliding contact of variable resistor 211 is connected through a capacitor 259 to deflector plate 155. The sliding contact of resistor 212 is connected through a capacitor 216 to the deflector plate 156. The sliding contacts of the resistors 211 and 212 are operated concurrently by a common control knob 217.

By operating the knob 217, the proportion of the total output potential from stage 160 which is applied to the deflector plates 155 and 156 may be varied without unbalancing the load between the triodes 164 and 165 and without varying the total loads on those triodes. This maintenance of a fixed load and a fixed distribution of load between the two triodes is important in maintaining fixed phase relationships through out the sine and cosine generator 159.

The network 208 is similar in all respects to the network 207, and comprises fixed resistors 218 and 219, and variable resistors 220 and 221, having sliding contacts operated by a common control knob 222. These sliding contacts are respectively connected through capacitors 223 and 224 to the deflector plates 158 and 157.

The terminals of the secondary winding 194 are connected through wires 235 and 236 to the sine generator input terminals of the Y analyzer 40, which supply the primary winding 81 of the analyzer. The terminals of secondary winding 173 are similarly connected through wires 237 and 238 to the cosine input terminals of the X analyzer 41.

The iconoscope 150 has signal output terminals 239 and 240, which may be connected to the input terminals of amplifier 56 of FIG. 5, replacing the photocell output terminals shown as being connected there.

The scanning system illustrated in FIGS. 11 and 12 has an advantage over that illustrated in FIG. 4, in that there is no necessary mechanical synchronism between the sine and cosine generators and the rotating mirror which produces the scanning action in FIG. 4. The necessary synchronism is obtained in FIG. 12 by feeding the deflector plates 154 from the same sine and cosine generator which supplies current to the analyzers 40 and 41.

My invention is disclosed herein as applied to a system of rectangular coordinates. It is contemplated that it may also be applied to other coordinate systems, such as a system of polar coordinates.

While I have shown and described certain preferred embodiments of my invention, other modifications thereof will readily occur to those skilled in the art, and I therefore intend my invention to be limited only by the appended claims.

I claim:

1. A line tracer comprising a table element for supporting a pattern defining a line, a tracer element for scanning cyclically a path intersecting said line, means for relatively moving said table and tracer elements, means including said tracer element for producing on each cycle a first signal varying directly with the apparent deviation between the tracer element position and the line and a second signal varying inversely with said apparent deviation, means responsive to said second signal for controlling the velocity of said moving means, and means responsive to said first signal for modifying the velocity of said moving means when said first signal is different from zero.

2. A line tracer as defined in claim 1, including pull-in control means operable between a normal tracing position and a pull-in position in which said pull-in control means is effective to cut off said second signal, whereupon said first signal controls the moving means to reduce said first signal to zero.

3. A line tracer, comprising a table element for supporting a pattern including a line defined by adjoining areas of substantially different optical characteristics, a tracer element including light sensitive means for scanning cyclically a circular path intersecting said line and having its center on an optical axis extending at an angle to said table, pickup means including said light sensitive means for producing an electrical signal pulse whenever the circular path intersects said line, said pickup means being effective to produce on each scanning cycle one leading pulse and one lagging pulse corresponding to the leading and lagging intersections of the path with the line, means for relatively moving the table and tracer elements comprising first and second coordinate reversible motor means operatively connected to one of said elements for driving it respectively in first and second coordinate directions, means for producing two sinusoidally varying signals synchronously related to the cycle of scanning of said path and having a time phase displacement from each other corresponding to the angular displacement between said two coordinate directions; control means for each coordinate motor means, each said control means including one of said first sampling means for sampling the sinusoidally varying signals of said one means concurrently with the leading pulses of the pickup means, second sampling means for sampling the sinusoidally varying signals of said one means concurrently with the lagging pulses of the pickup means, means including both said sampling means to produce a potential signal having an amplitude which measures the algebraic sum of the components in one coordinate direction of the displacement of the leading and lagging intersections from the optical axis, and means responsive to said potential signal for controlling the velocity of the motor means.

4. A line tracer as defined in claim 3, including means for selecting a linear velocity for the relative movement of said elements, said velocity means being effective when said algebraic sum for one motor control means is zero to establish the velocity of its associated motor means.

5. A line tracer, comprising a table element for supporting a pattern including a line defined by adjoining areas of substantially different optical characteristics, a tracer element including light sensitive means for scanning cyclically a circular path intersecting said line and having its center on an optical axis extending at an angle to said table, pickup means including said light sensitive means for producing an electrical signal pulse whenever the circular path intersects said line, said pickup means being effective to produce on each scanning cycle one leading pulse and one lagging pulse corresponding to the leading and lagging intersections of the path with the line, means for relatively moving the table and tracer elements comprising first and second coordinate reversible motor means operatively connected to one of said elements for driving it respectively in first and second coordinate directions, means for producing two sinusoidally varying signals synchronously related to the cycle of scanning of said path and having a time phase displacement from each other corresponding to the angular displacement between said two coordinate directions; control means for each coordinate motor means, each said control means including one of said means for producing sinusoidally varying signals, first sampling means for sampling the sinusoidally varying signals of said one means concurrently with the leading pulses of the pickup means, second sampling means for sampling the sinusoidally varying signals of said one means concurrently with the lagging pulses of the pickup means, means including both said sampling means to produce a potential signal having an amplitude which measures the algebraic difference of the components in one coordinate direction of the displacement of the leading and lagging intersections from the optical axis, means driven by the motor means to produce a potential which measures the velocity thereof, means for opposing said velocity-measuring potential against the potential representing the algebraic difference of the coordinate components, and thereby producing a velocity control potential, and means responsive to the sum of the coordinate components and to said velocity control potential for controlling the velocity of the motor means.

6. A line tracer, comprising a table element for supporting a pattern including a line defined by adjoining areas of substantially different optical characteristics, a tracer element including light sensitive means for scanning cyclically a circular path intersecting said line and having its center on an optical axis extending at an angle to said table, pickup means including said light sensitive means for producing an electrical signal pulse whenever the circular path intersects said line, said pickup means being effective to produce on each scanning cycle one leading pulse and one lagging pulse corresponding to the leading and lagging intersections of the path with the line, means for relatively moving the table and tracer elements comprising first and second coordinate reversible motor means operatively connected to one of said elements for driving it respectively in first and second coordinate directions, means for selecting a linear velocity for the relative movement of said elements, means for producing two sinusoidally varying signals synchronously related to the cycle of scanning of said path and having a time phase displacement from each other corresponding to the angular displacement between said two coordinate directions; control means for each coordinate motor means, each said control means including means for sampling one of said sinusoidally varying signals during each cycle at times marked by the leading pulses of the pickup means to produce potential signals having amplitudes which measure the component in one coordinate direction of the displacement of the leading intersections from the optical axis, means for storing and averaging said potential signals over a plurality of cycles, means for adding said stored signal to said one sinusoidal signal in two opposite phases to produce two composite signals, means for sampling said composite signals during each cycle at times marked by the lagging pulses of the pickup means to produce two potential signals which measure respectively the sum and the difference of the components in said one coordinate direction of the displacements of the leading and lagging intersections from the optical axis, means driven by the motor means to produce a potential which measures the motor velocity, means for opposing said velocity-measuring potential against the potential representing the difference of the coordinate components, and thereby producing a velocity control potential, and means responsive to the sum of the coordinate components and to said velocity control potential for controlling the velocity of the motor means; said control means for the two motor means being effective to establish the linear velocity of the element driven by the motor means at said selected velocity when said apparent deviation of the optical axis from the edge is zero, and being effective when the apparent deviation is different from zero to modify the coordinate velocities to reduce said apparent deviation to zero.

7. A line tracer as defined in claim 6 including a manually rotatable control element operable to produce an electrical signal varying continuously as a function of the angular position of said element, a manually operable control device movable between a trace position in which said sum and difference potential signals control the motor means and a manual position in which said sum and difference signals are cut off and a signal from said control element is substituted for said difference signal, so that said driven element moves in a direction determined by the position of said control element.

8. A line tracer as defined in claim 6, including a manually operable control device movable between a trace position in which said sum and difference potential signals control the motor means, and a pull-in position in which said difference signal is cut off and said sum signal controls the motor means to bring the optical axis into alignment with the line to be traced and then to stop.

9. A line tracer, comprising a table element for supporting a pattern including a line defined by adjoining areas of substantially different optical characteristics, a tracer element including light sensitive means for scanning cyclically a circular path intersecting said line and having its center on an optical axis extending at an angle to said table, pickup means including said light sensitive means for producing an electrical signal pulse whenever the circular path intersects said line, said pickup means being effective to produce on each scanning cycle one leading pulse and one lagging pulse corresponding to the leading and lagging intersections of the path with the line, means for producing an electrical signal measuring the component in one direction of the displacement between the axis and the line, comprising means for generating a sinusoidal signal synchronous with the scanning cycle and in phase with the displacement of the scanning spot in said direction, first sampling means for sampling said sinusoidal signal during each cycle at times marked by the leading pulses of the pickup means to produce potential signals having amplitudes which measure the component in one coordinate direction of the displacement of the leading intersections from the optical axis, means including a first capacitor for storing and averaging said potential signals over a plurality of cycles, means for adding said stored signal to said sinusoidal signal to produce a composite signal, second sampling means for sampling said composite signal during each cycle at times marked by the lagging pulses of the pickup means to produce potential signals which measure the sum of the components along said one coordinate direction of the displacements of the leading and lagging intersections from the optical axis, and means including a second capacitor for storing and averaging said last-mentioned signals.

10. A line tracer as defined in claim 9, including a transformer having a primary winding connected to said generating means and a secondary winding; said first storing and averaging means comprising a first circuit including in series at least a portion of said secondary winding, said first sampling means and said first capacitor; said second storing and averaging means comprising a second circuit including in series said portion of said secondary winding, said second sampling means and said first and second capacitors, said sum measuring potential signal being stored on said second capacitor.

11. A line tracer, comprising a table element for supporting a pattern including a line defined by adjoining areas of substantially different optical characteristics, a tracer element including light sensitive means for scanning cyclically a circular path intersecting said line and having its center on an optical axis extending at an angle to said table, pickup means including said light sensitive means for producing an electrical signal pulse whenever the circular path intersects said line, said pickup means being effective to produce on each scanning cycle one leading pulse and one lagging pulse corresponding to the leading and lagging intersections of the path with the line, means for producing an electrical signal varying inversely with the component in one direction of the displacement between the axis and the line, comprising means for generating a sinusoidal signal synchronous with the scanning cycle and in phase with the displacement of the scanning spot in said direction, first sampling means for sampling said sinusoidal signal during each cycle at times marked by the leading pulses of the pickup means to produce potential signals having amplitudes which measure the component in one coordinate direction of the displacement of the leading intersections from the optical axis, means including a first capacitor for storing and averaging said potential signals over a plurality of cycles, means for adding said stored signal to the inverse phase of said sinusoidal signal to produce a composite signal, second sampling means for sampling said composite signal during each cycle at times marked by the lagging pulses of the pickup means to produce potential signals which measure the difference of the components along said one coordinate direction of the displacements of the leading and lagging intersections from the optical axis, and means including a second capacitor for storing and averaging said last-mentioned signals.

12. A line tracer as defined in claim 11, including a transformer having a primary winding connected to said generating means and a secondary winding having two end terminals and a center tap; said first storing and averaging means comprising a first circuit including in series the portion of the secondary winding between one terminal and the center tap, said first sampling means and said capacitor, said capacitor having one terminal connected to said center tap; said second storing and averaging means comprising a second circuit including in series the portion of the secondary winding between the center tap and the other end terminal, said second sampling means and said second and first capacitors, said inversely varying potential being stored on said second capacitor.

13. Apparatus for cutting from a work piece a part having an outline corresponding to that of a pattern, comprising: a line tracer including a table element for supporting the pattern so that the outline thereof is defined by adjoining pattern and background areas having different optical characteristics, a tracer element including light sensitive means for scanning said line, and means responsive to the light sensitive means for moving said elements relative to one another so that the tracer follows the line; a cutting machine including a cutting head, a table for supporting a work piece, motor means for producing relative movement of the cutting head and table, and means for controlling said motor means synchronously with the element moving means so that the cutting head cuts the work piece in an outline corresponding to the pattern; starting apparatus comprising an elongated guide member having optical characteristics contrasting with those of the background area, said guide member being effective when placed on the table element with one end overlapping the pattern area and the other end overlapping the table edge to guide the tracer for movement from a point corresponding to the work piece edge to a point on the pattern outline, so that the cutting head makes an initial cut from the work piece edge to a point corresponding to the pattern outline.

14. A line tracer, comprising a table element for supporting a pattern defining a line between adjoining areas of contrasting optical characteristics, a tracer element including a photosensitive screen, means for projecting an image of a portion of the pattern on the screen, means for scanning a circular path on the screen cylically with a cathode ray, means including the screen for producing a pulse signal whenever the ray intersects the image of the line, means for relatively moving the table and tracer elements, and means responsive to said pulse signals for controlling said moving means so that the tracer element follows the line.

15. A line tracer as defined in claim 14, in which: said relatively moving means comprises first and second coordinate reversible motor means operatively connected to one of said elements for driving it respectively in first and second coordinate directions; said scanning means comprises two pairs of opposed deflector plates through which said cathode ray passes, each pair being parallel to one of said coordinate directions, a sine-cosine generator having two sets of output terminals and means for producing across said sets of output terminals sinusoidally varying potentials differing in time phase from each other by an angle corresponding to the difference in space phase of said two coordinate directions, and means connecting said sets of output terminals respectively to the two pairs of deflector plates; and said controlling means includes means for sampling said sinusoidally varying potentials at times marked by said pulse signals to produce potential signals measuring the displacement of the center of the scanned circle from the image of the line on the screen.

16. A line tracer as defined in claim 15, in which said sine-cosine generator includes a first amplifier stage, a first 90° phase-shifting bridge having an input connected to the output of the first amplifier stage, a second amplifier stage having an input connected to the output of the first bridge and an output, a second 90° phase-shifting bridge having an input connected to the output of the second amplifier stage and an output connected to the input of the first stage, said bridges being connected so that the shift in phase between the first stage output and the second stage input is opposite in sense from the shift in phase between the second stage output and the first stage input, so that said outputs are separated 90° in phase.

17. A sine-cosine generator comprising a first amplifier stage, a first 90° phase-shifting bridge having an input connected to the output of the first amplifier stage, a second amplifier stage having an input connected to the output of the first bridge and an output, a second 90° phase-shifting bridge having an input connected to the output of the second amplifier stage and an output connected to the input of the first stage, said bridges being connected so that the shift in phase between the first stage output and the second stage input is opposite in sense from the shift in phase between the second stage output and the first stage input, and means for taking separate output signals, separated 90° in phase, from the outputs of the first and second stages.

18. Motor control apparatus, comprising an electric motor, amplifier means controlling the supply of electrical energy to the motor, signal input means for the amplifier means including a first impedance element, a tachometer driven by the motor for producing across the first impedance element a first variable signal potential varying directly with the motor velocity, a second impedance element, means for producing across said second impedance element a second variable signal potential having a predetermined maximum value, a balanceable network, means connecting at least portions of the impedance elements in series with the polarities of the potentials opposed with respect to the balance of said network, means connecting the network to the signal input means, said first signal acting in an energy supply decreasing sense and said second signal in an energy supply increasing sense, manually operable means for varying the portion of the second impedance element connected in said network, and means responsive to a variable condition to reduce the second signal potential below said maximum when the condition departs from a predetermined value, whereby the motor runs at a speed selected by the manually operable means as long as the variable condition is at said value, and runs at lower speeds whenever the condition departs from said value.

19. Motor control apparatus as defined in claim 18, including further means responsive to said variable condition for introducing a speed reducing signal directly to said amplifier means upon departure of said condition from said predetermined value.

References Cited in the file of this patent

UNITED STATES PATENTS

| | | |
|---|---|---|
| 2,397,933 | Fowle et al. | Feb. 19, 1943 |
| 2,499,178 | Berry et al. | Feb. 28, 1950 |
| 2,578,341 | Doba | Dec. 11, 1951 |
| 2,696,565 | Shockley | Dec. 7, 1954 |
| 2,820,187 | Parsons et al. | Jan. 14, 1958 |
| 2,837,707 | Stokes | June 3, 1958 |
| 2,868,993 | Henry | Jan. 13, 1959 |

OTHER REFERENCES

General Electric Review, June 1950, vol. 53, pages 44, 45, 46, 47.

UNITED STATES PATENT OFFICE
CERTIFICATE OF CORRECTION

Patent No. 3,004,166                 October 10, 1961

William J. Greene

It is hereby certified that error appears in the above numbered patent requiring correction and that the said Letters Patent should read as corrected below.

Column 3, line 20, for "respresent" read -- represent --; column 10, lines 16 and 17, for "conncted" read -- connected --; lines 17 and 18, for "tachomter" read -- tachometer --; column 17, line 63, after "said" insert -- means for producing sinusoidally varying signals, --.

Signed and sealed this 10th day of April 1962.

(SEAL)
Attest:

ERNEST W. SWIDER
Attesting Officer

DAVID L. LADD
Commissioner of Patents